Feb. 10, 1931. E. J. EXTER 1,791,720
PIANO TEACHING INSTRUMENT
Filed Nov. 20, 1929 3 Sheets-Sheet 2
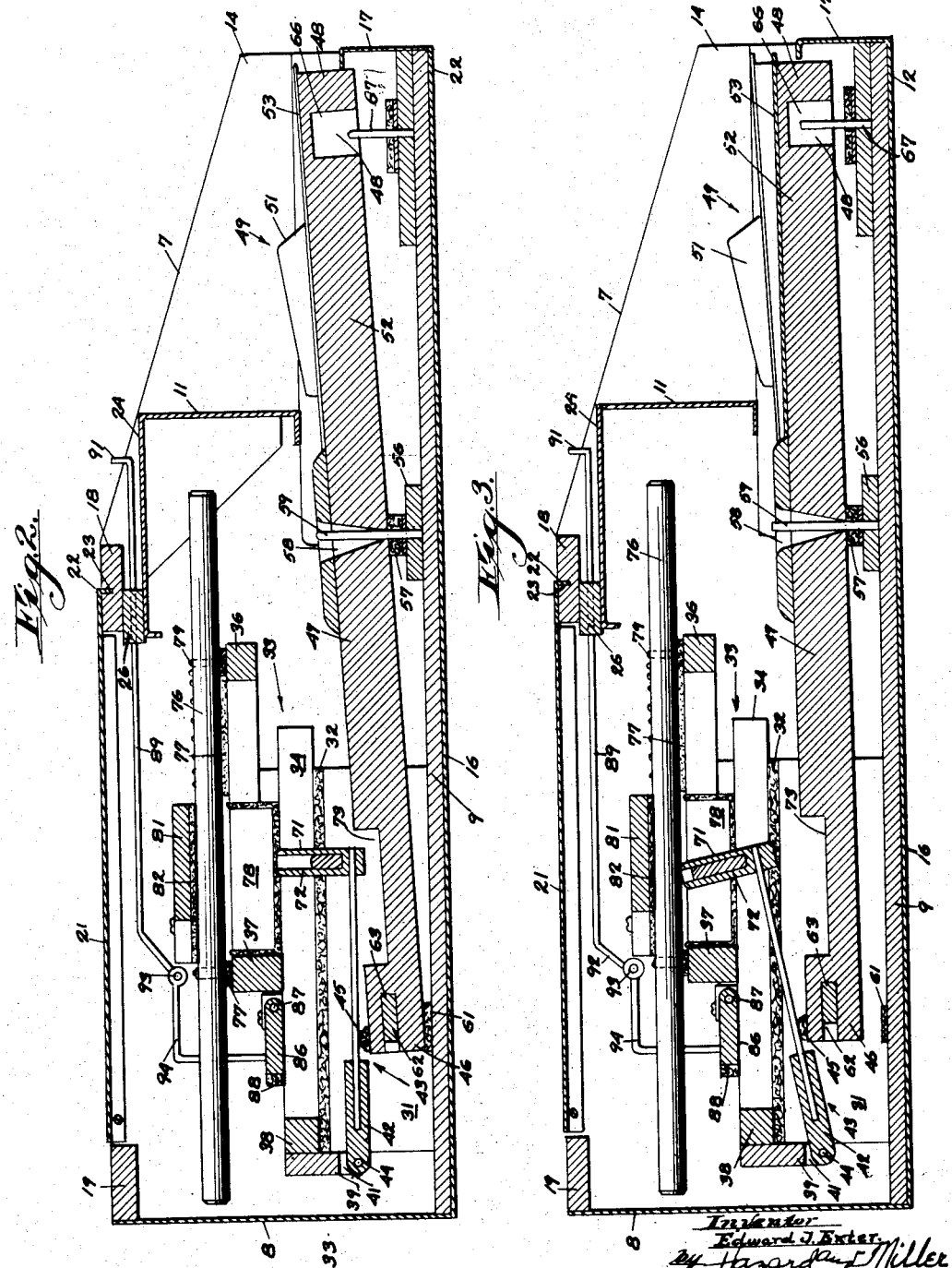

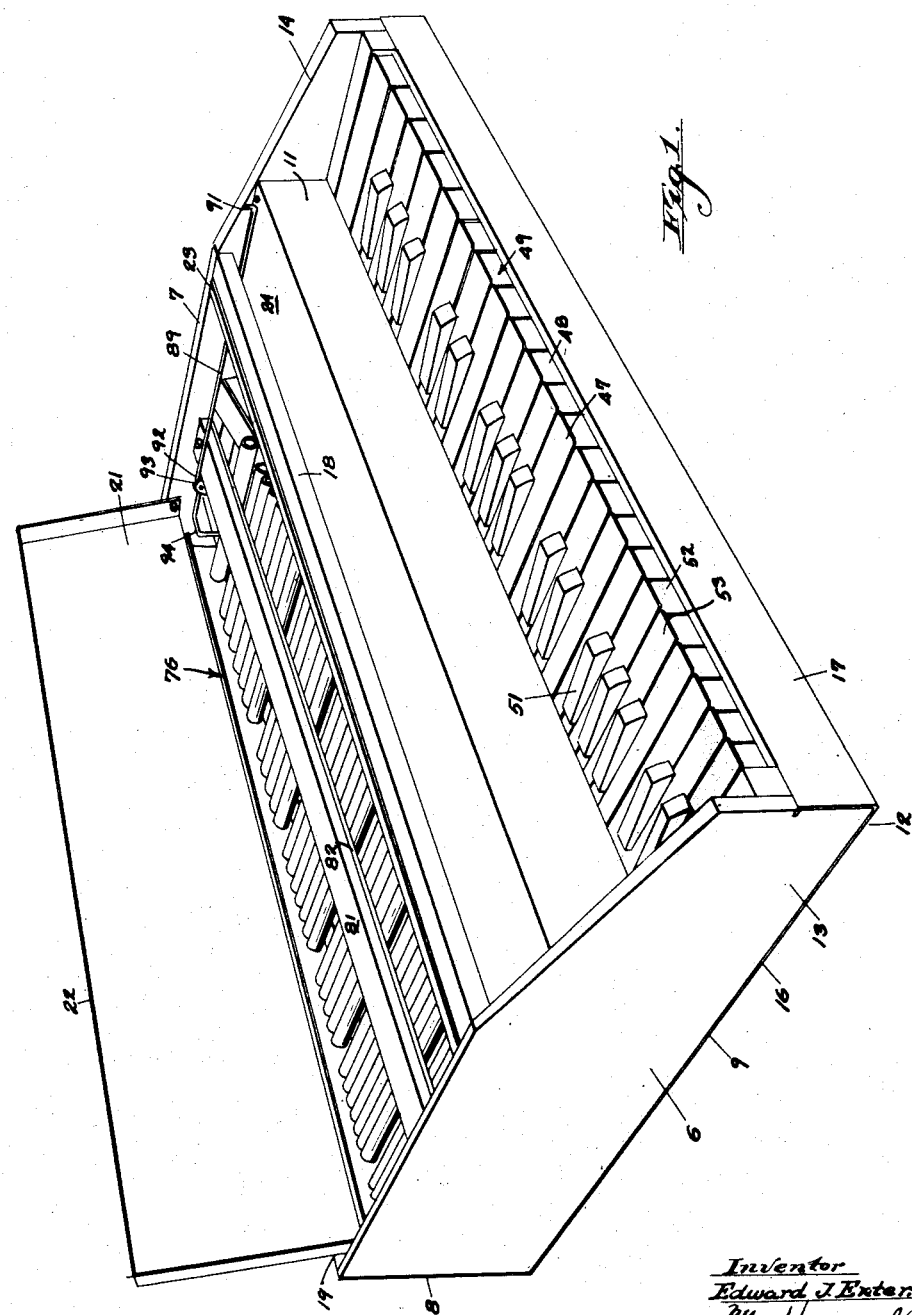

Feb. 10, 1931. E. J. EXTER 1,791,720
PIANO TEACHING INSTRUMENT
Filed Nov. 20, 1929 3 Sheets-Sheet 3
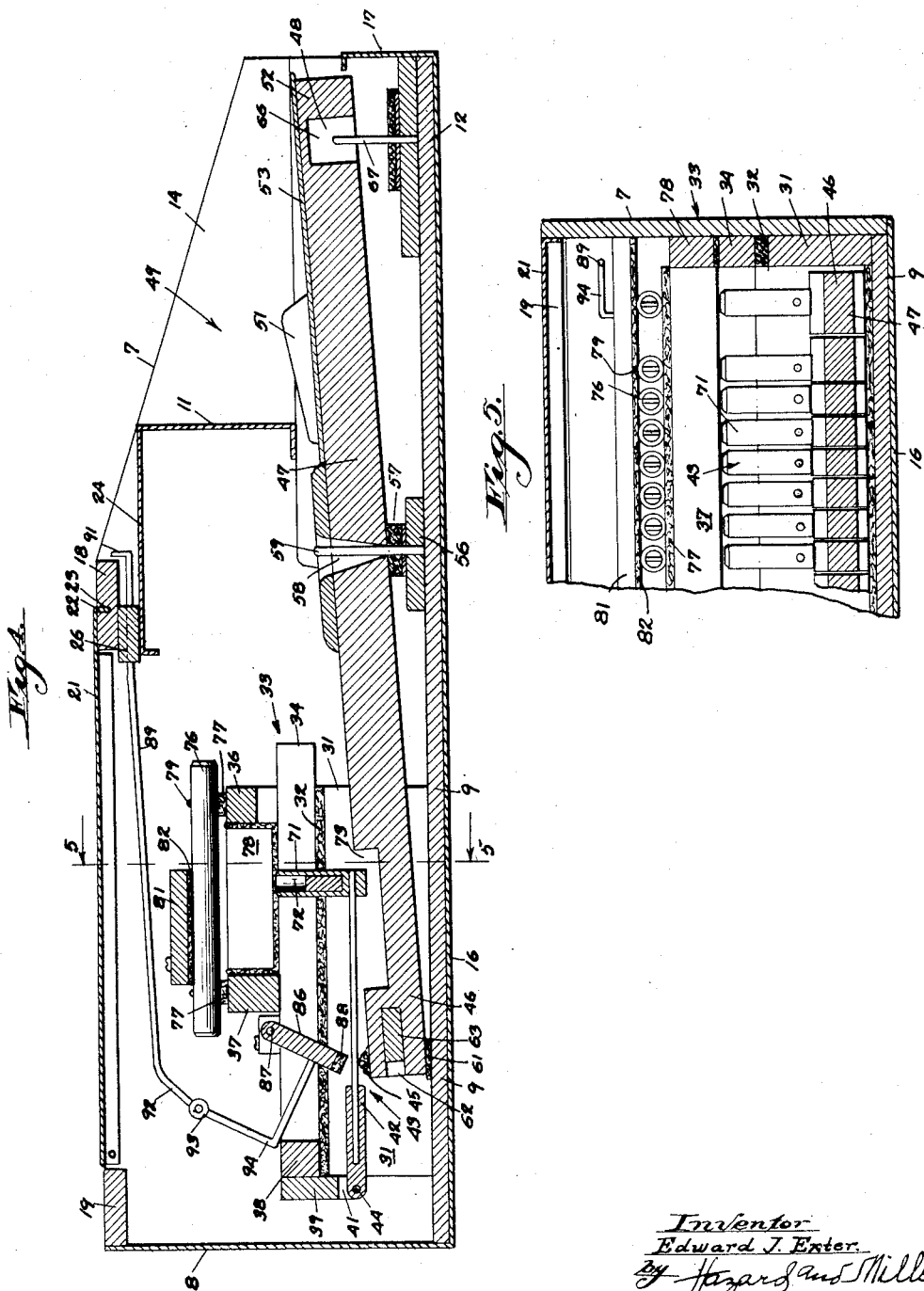
Inventor
Edward J. Exter.
by Hazard and Miller
Attorneys Patented Feb. 10, 1931

1,791,720

UNITED STATES PATENT OFFICE

EDWARD J. EXTER, OF HOLLYWOOD, CALIFORNIA

PIANO TEACHING INSTRUMENT

Application filed November 20, 1929. Serial No. 408,552.

This invention relates to musical instruments, and more especially to a device whereby giving instructions in piano playing, may be materially facilitated.

An object of the invention is the provision of a practice piano of relatively low cost, and by means of which a student may practice fingering exercises, so as to attain skill in manipulation of the keys of the regulation piano.

Another object is the provision of a practice piano composed of a keyboard and a musical device associated with each key of the keyboard, as well as a suitable action whereby a selected musical device may be sounded by depressing the associated key.

A still further object is the provision of a practice piano as described, wherein the sounding devices are in the form of metallic tubes graduated in length proportionally with the musical scale, and adapted to be set into vibration when struck by a hammer, each of the keys of the keyboard having a hammer associated therewith in position to strike the appropriate tube upon depression of its key.

Another object is the provision of a piano action for the practice piano of the present invention, which is of extreme simplicity, and yet which is capable of operating with a high degree of efficiency and sensitivity to even slight motion of the keys.

Another object is the provision of means for limiting the stroke of the hammers in such a manner as to permit depression of the keys throughout at least a major portion of their movement, but to prevent the hammers from coming into contact with the vibratile tubes.

A still further object is the provision of a practice piano as described, which is of very simple and exceptionally light construction, even to such an extent that the entire device may be supported upon the lap of the student, and thus permit the student to practice playing the piano under circumstances previously precluded because of the cumbersome nature of the conventional piano.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a perspective view of a practice piano incorporating the principles of the present invention.

Fig. 2 is a transverse sectional view showing one of the keys and its associated hammer in normal position.

Fig. 3 is a view similar to Fig. 2, but showing the key depressed and its associated hammer raised into position to engage the vibratile tube.

Fig. 4 is a view similar to Fig. 2, but showing the means for limiting the stroke of the hammers swung into position to prevent engagement of the hammers with the tubes, and still permit a certain degree of depression of the certain keys.

Fig. 5 is a longitudinal sectional view of a portion of the instrument, the plane of section being indicated by the line 5—5 of Fig. 4, and the direction of view by the arrows.

Specifically describing that embodiment of the instrument of the present invention, which is deemed to be the most practical, it is enclosed within a case comprising end walls 6 and 7 joined by a back wall 8 and bottom 9, and a front wall 11 which is considerably less in height than that of the rear wall 8 being positioned with its lower edge spaced above the bottom 9. The end walls 6 and 7 and bottom 9 extend a considerable distance beyond the front wall 11, so that the forward portion 12 of the bottom 9, serves as a key frame extending between the forward projections 13 and 14 of the ends 6 and 7 respectively. The ends 6 and 7 and the bottom 9. may conveniently be constructed of wood, having a sheet 16 of metal below the bottom 9, bent upwards at the after edge thereof, to form the back wall 8. The sheet 16 of metal is also bent up at the forward edge of the bottom 9, forming a front flange 17 defining the forward edge of the key frame 12. The forward projections 13 and 14 of the end walls 6 and 7, slope downwards as they approach their extreme forward ends; and a suitable brace 18 extends between the ends 6 and 7, just aft of the point at which the inclination of the projections 13 and 14 commences. A similar brace 19 extends between the ends 6 and 7 at their upper rear corners; and a suitable cover 21 preferably of metal, is pivoted to the ends 6 and 7 just forward of the after brace 19 and has a flange 22 at its forward edge, adapted to seat within a notch 23 extending longitudinally of the strip 18, when the cover is closed. The front 11 is provided with a horizontal flange 24 extending inwards from the upper edge thereof, below the strip 18, there being an additional strip 26 interposed therebetween so as to effectually close the intervening space.

A cleat 31 is made fast to the inner face of each of the ends 6 and 7; and upon each of the cleats 31, a pad 32 of suitable cushioning material such as relatively heavy felt, is secured. Resting upon the two cushioning pads 32, is a framework indicated in its entirety at 33, and composed of two end bars 34, each of which rests upon one of the felts 32, these bars 34 being joined by longitudinally extending strips 36, 37, and 38. Of these, the two forward strips 36 and 37 serve as supports for the sounding devices, whereas the strip 38 serves as an action bar. Secured to the after side of the action bar 38 and depending therefrom, are a plurality of brackets 39, each of which is bifurcated at its lower end, as indicated at 41, to receive the after end of the shank 42 of a percussion hammer 43. A pivot pin 44 extends through the end of the shank 42, then through the bifurcated portion 41 of the bracket 39, to pivotally join these parts. The shank 42 of each hammer 43, extends forward from its bracket 39, and is supported upon a preferably rounded pad 45 made fast to the after end 46 of an elongated key 47.

The several keys 47 are arranged side by side with their forward ends 48 extending under and beyond the front wall 11, so as to form a keyboard 49 having the appearance of the conventional piano keyboard, inasmuch as the forward ends 48 of the several keys 49 are arranged in octaves, and because certain of the keys 47 are shorter than the others, and are disposed at a slightly greater elevation. These shorter keys 51 are preferably dark colored, whereas the longer keys 52 are white. They may be overlaid if desired, with suitable finishing material such as celluloid, or ivory strips 53, whereas the shorter, darker colored keys 51 may be composed of any suitable dark colored material such as hard rubber or its equivalent. The keys 47 are preferably arranged in octaves, in the same manner as the keyboard of the conventional piano, having seven of the longer keys 52 to each octave, and five of the shorter keys.

All the keys 47 rest upon a balance rail 56 secured to the bottom 9 of the case and extend longitudinally thereof, there being a pad 57 of cushioning material such as felt, extending along the top of the rail 56. Each of the keys 47 has an aperture 58 extending vertically therethrough, intermediate its ends 46 and 48, this aperture being widened longitudinally of the key 47 at the upper end of the aperture 58. A pin 59 extends through each of the apertures 58, these pins being rigid with and extending vertically upwards from the balance rail 56. The shape of the apertures 58, permits the keys 47 to be rocked, and yet each key 47 is restrained against movement longitudinally or transversely of the case, inasmuch as its aperture 58 is of approximately the same diameter at its lower end as the pin 59, the widening of the aperture 58 at its upper end, permitting rocking of each key 47 as will readily be understood. The keys 47 are so proportioned that each aperture 58 is disposed forward of the center of gravity of the associated key 47; with the result that the after end 46 of each key 47 normally rests upon the bottom 9 of the case. For this purpose a suitable pad 61 may be disposed so as to silence the keys in falling into retracted position. If desired, a hole 62 may be drilled into the after end 46 of each key 47, to permit the insertion of a suitable weight 63, so as to insure that when at rest, each key 47 will be tilted with its forward end 48 raised above the key frame 12.

Each of the longer keys 52 has a slot 66 in its under face adjacent the forward end 48 thereof, to receive the upper end of a guide pin 67 which extends upwards from the key frame 12, so as to permit rocking movement of the associated key 47 about its pivotal support upon the balance rail 56, and still retain the key 47 against pivoting horizontally about the pin 59.

As stated hereinabove, the shank 42 of each of the hammers 43, extends forward from the pivotal mounting 44 thereof, and rests upon the pad 45 carried by the after end 46 of the associated key 47. As a result of this arrangement, the head 71 of the hammer 43, will be swung upwards when the forward end 48 of the associated key 47 is depressed. Preferably the head 71 of each hammer 43, is composed of a suitable length of wooden rod having a hole 72 drilled downwards from its upper end throughout the major portion of the length of the head 71. The length of the shank 42 of each hammer 43, is such that the heads 71 of all the hammers are disposed under the space between strips 36 and 37 when in retracted position; with the result that when any one of the keys 47 is depressed, the associated hammer head 71 will be projected upwards between the strips 36 and 37. In order to prevent interference between the heads 71 of the hammers 43 and their associated keys 47, a notch 73 is formed in the upper face of each key 47 in register with the associated hammer head, so that when in retracted position this head drops at least partially into the notch 73, and thus avoids coming into contact with the key 47.

A plurality of sounding devices are supported upon the strips 36 and 37. These sounding devices are in the form of elongated metallic tubes 76, each of which is supported adjacent each end upon a felt cushioning strip 77. These strips 77 are carried by the strips 36 and 37. One of the tubes 76 lies within the path of each of the hammer heads 71, so as to be percussed thereby when that hammer head is swung upwards, the purpose being to set the tube into vibration and thus produce a musical note. Inasmuch as the pitch of the note produced by the vibration of each tube 76 is determined by the length of that tube, the tubes 76 are graduated as to length, and so arranged that a note of the proper pitch is produced upon depression of the forward end 48 of any one of the keys 47. Hence, the tubes 76 associated with the white or longer keys 52, are of such length that the tones produced thereby are "natural" tones, whereas the length of the tubes 76 associated with the shorter or black keys 51, is such that they are adapted to give the chromatic semitones to complete the octaves in which the black keys 51 are situated.

Hence, the tubes 76 will gradually increase in length from one end of the case toward the other, and for the purpose of properly supporting the tubes 76, the strips 36 and 37 diverge in the same direction. Preferably, the after strip 37 is arranged parallel to the front and rear walls 11 and 8 respectively, whereas the front strip 36 is disposed in obliquity therewith. The spacing between the strips 36 and 37, which is determined by means of a spacing block 78, is such that the felt pads 77 engage the tubes 76 at a short distance from each end thereof, the parts being so proportioned and arranged that the engagement between the felt strips 77 and the tubes 76 takes place at such points in the length of the tubes, that the least interference with their normal vibration, is set up.

The tubes 76 are held spaced from each other by means of pins 79 rigid with the strips 36 and 37, and extending upward through suitable apertures drilled transversely through the tubes 76. Another strip 81 extends longitudinally of the case above all the tubes 76, and is provided with a cushioning pad 82 on its under surface, only slightly spaced from the tubes 76, the purpose being to prevent the tubes from being lifted off their respective pins 79 when struck from underneath by their associated hammers 43. Thus it may be seen that the tubes 76 serve as vibratile sounding devices, each of which is capable of producing a note of different pitch from that produced by any of the other tubes 76; with the result that the device of the present application may be employed in the same manner as the conventional piano. The device is primarily designed however, for the purpose of practice, so that a student of the technique of piano playing, may acquire skill in fingering. The device is not in reality, intended to be employed as a true musical instrument, inasmuch as it is not possessed of the qualities of tone attained by the use of the conventional stringed piano. However, by substituting the tubes 76 in the place of the strings under tension, it is made possible to eliminate the necessarily extremely heavy framework for the support of the tensioned strings, the combined tension of which, in the conventional piano, aggregates several tons. However, the note produced by each of the tubes 76, while perhaps lacking in tonal qualities, is of true pitch, and hence capable of indicating to the user, which note has been struck.

Means are also provided for silencing the instrument so as to permit the student to practice fingering, without setting any of the tubes 76 into vibration. A strip 86, extending longitudinally of the case, is pivoted to the frame 33 at each end thereof, and for pivotal movement about an axis 87 adjacent the upper forward edge of the strip 86. A strip 88 of cushioning material, is secured to the other edge of the strip 86, which is so proportioned that when the strip 86 is swung downward as shown upon Fig. 4, the cushioning strip 88 may be positioned within the paths of the several hammers 43, but spaced slightly thereabove. This will permit partial depression of the keys 47, but will obstruct the movement of the hammers 43 so that engagement between the heads 71 thereof and their respective tubes 76, is precluded. Preferably, when in silencing position, the cushioning strip 88 is disposed immediately above the pads 45, carried by the after ends 46 of the keys 47, so as to eliminate any bending moment which would be imparted to the shanks 42 of the hammers 43, if the parts were otherwise arranged.

The means for optionally moving the strips 86 and 88 into or from silencing position, are in the form of a push rod 89 extending through the strip 26, so that the forward end 91 thereof is accessible from the front of the case above the keyboard 49. The inner end 92 of the rod 89, is engaged within an eye 93 of a rod 94, which is attached at its other end to the strip 86 in such a manner that when the rod 89 is pushed inwards, the strips 86 and 88 will be swung downwards into silencing position, and when the rod 89 is pulled forward, the strips will be swung upward out of the paths of the hammers.

This silencing device has proved particularly useful when several of the practice instruments of the present invention are employed in conjunction with the relatively recently developed method of teaching piano playing, wherein several students are supervised by a single teacher. During the progress of such group instruction, all the students practice the same exercises simultaneously, and under normal circumstances, will be able to play in unison, or so nearly in unison that whenever any one of the students strikes a false note, the teacher will be able to detect the error and correct the erroneous pupil. However, when any one pupil is unusually deficient, to such an extent that he distracts the attention of the more advanced or more skillful pupils, the teacher may silence the instrument employed by the deficient pupil, and permit him to proceed with his practice without interfering with the practice of the other pupils.

It is to be understood that the details of the invention as herein disclosed, are subject to alteration within the spirit or scope of the appended claims.

I claim:

1. A practice piano comprising a balance rail, a pad of cushioning material carried thereby, a key resting intermediate its ends upon said pad, a hammer pivotally mounted adjacent the inner end of said key and supported thereupon to be swung upwards thereby when the outer end of the key is depressed, a vibratile sounding device lying within the path of said hammer, and means for limiting the stroke of said hammers to prevent their engagement with said sounding devices.

2. A practice piano comprising a balance rail, a pad of cushioning material carried thereby, a key resting intermediate its ends upon said pad, a hammer pivotally mounted adjacent the inner end of said key and supported thereupon to be swung upwards thereby when the outer end of the key is depressed, a pad of cushioning material interposed between said key and hammer, and a vibratile sounding device lying within the path of said hammer.

3. A practice piano comprising a balance rail, a key resting intermediate its ends thereupon, a hammer pivotally mounted adjacent the inner end of said key and supported thereupon to be swung upwards thereby when the outer end of the key is depressed, a vibratile sounding device lying within the path of said hammer, and releasable means for limiting the stroke of said hammer to prevent engagement therewith with said sounding device.

4. A practice piano comprising a case, a rigid balance rail extending longitudinally thereof, a plurality of elongated keys lying across said rail with their forward ends accessible at the front of the case, the after end of each key being heavier than the forward end and normally resting upon the bottom of the case, a cleat secured to each end of the case, a pad of cushioning material on each of said cleats, an action bar mounted longitudinally of said case behind the after ends of said keys, said action bar being supported upon said pads, a percussion hammer associated with each of said keys, each hammer being pivoted to said action bar and extending forward therefrom, said hammers being supported upon the after ends of their respective keys, and a vibratile sounding device mounted in the path of each of said hammers.

5. A practice piano comprising a case, a rigid balance rail extending longitudinally thereof, a plurality of elongated keys lying across said rail with their forward ends accessible at the front of the case, the after end of each key being heavier than the forward end and normally resting upon the bottom of the case, a cleat secured to each end of the case, a pad of cushioning material on each of said cleats, an action bar mounted longitudinally of said case behind the after ends of said keys, said action bar being supported upon said pads, a percussion hammer associated with each of said keys, each hammer being pivoted to said action bar and extending forward therefrom, said hammers being supported upon the after ends of their respective keys, and a vibratile sounding device mounted in the path of each of said hammers, said sounding device also being supported upon said pads.

6. A practice piano comprising a case, a rigid balance rail extending longitudinally thereof, a plurality of elongated keys lying across said rail with their forward ends accessible at the front of the case, the after end of each key being heavier than the forward end and normally resting upon the bottom of the case, an action bar mounted longitudinally of said case behind the after ends of said keys, a percussion hammer associated with each of said keys, each hammer being pivoted to said action bar and extending forward therefrom, said hammers being supported upon the after ends of their respective keys, a vibratile sounding device mounted in the path of each of said hammers, and releasable means for limiting the stroke of said hammers to prevent their striking said sounding devices.

7. A practice piano comprising a case, a rigid balance rail extending longitudinally thereof, a plurality of elongated keys lying across said rail with their forward ends accessible at the front of the case, the after end of each key being heavier than the forward end and normally resting upon the bottom of the case, an action bar mounted longitudinally of said case behind the after ends of said keys, a percussion hammer associated with each of said keys, each hammer being pivoted to said action bar and extending forward therefrom, said hammers being supported upon the after ends of their respective keys, a vibratile sounding device mounted in the path of each of said hammers, and releasable means for limiting the stroke of said hammers, said stroke-limiting means comprising a strip extending longitudinally of said case and pivoted thereto for movement about an axis adjacent an edge of the strip, a cushioning strip carried by the opposite edge of said pivotally mounted strip, and means for swinging said limiting means to optionally position said cushioning strip within the paths of said hammers, or to withdraw the cushioning strip therefrom.

8. A practice piano comprising a case, a rigid balance rail extending logintudinally thereof, a plurality of elongated keys lying across said rail with their forward ends accessible at the front of the case, the after end of each key being heavier than the forward end and normally resting upon the bottom of the case, an action bar mounted longitudinally of said case behind the after ends of said keys, a percussion hammer associated with each of said keys, each hammer being pivoted to said action bar and extending forward therefrom, said hammers being supported upon the after ends of their respective keys, a vibratile sounding device mounted in the path of each of said hammers, and releasable means for limiting the stroke of said hammers, said stroke-limiting means comprising a strip extending longitudinally of said case and pivoted thereto for movement about an axis adjacent an edge of the strip, a cushioning strip carried by the opposite edge of said pivotally mounted strip, and means for swinging said limiting means to optionally position said cushioning strip within the paths of said hammers and spaced from said hammers in their lowermost positions thereof, or to withdraw the cushioning strip therefrom.

9. A practice piano, comprising a case, an action bar mounted longitudinally of said case, cushioning means interposed between said action bar and said case, a plurality of percussion hammers pivotally mounted on said action bar, a vibratile sounding device mounted in the path of each of said hammers, and a key associated with each of said hammers and adapted to swing the hammer into contact with its associated sounding device when the key is depressed.

10. A practice piano comprising a case, a frame disposed thereinside, cushioning means supporting said frame, a vibratile sounding device mounted upon said frame, cushioning means interposed between said sounding device and said frame, and means for striking said sounding device to set it into vibration.

11. A practice piano, comprising a case, a cleat secured to each end thereof, a pad of cushioning material on each of said cleats, a frame supported upon said pads, a plurality of vibratile sounding devices carried by said frame, an action bar mounted upon said pads, a plurality of percussion hammers pivotally mounted on said action bar, each of said sounding devices lying in the path of one of said hammers, and means associated with each of said hammers for swinging it into contact with the associated sounding device.

In testimony whereof I have signed my name to this specification.

EDWARD J. EXTER.